United States Patent [19]
Paruchuri et al.

[11] Patent Number: 5,894,054
[45] Date of Patent: Apr. 13, 1999

[54] ALUMINUM COMPONENTS COATED WITH ZINC-ANTIMONY ALLOY FOR MANUFACTURING ASSEMBLIES BY CAB BRAZING

[75] Inventors: Mohan R. Paruchuri, Canton; Dongkai Shangguan, Novi, both of Mich.

[73] Assignee: Ford Motor Company, Dearborn, Mich.

[21] Appl. No.: 08/781,569

[22] Filed: Jan. 9, 1997

[51] Int. Cl.$^6$ .............................. B32B 15/20; F28F 21/08
[52] U.S. Cl. .................. 428/642; 428/650; 428/658; 165/133; 165/905
[58] Field of Search ................ 428/650, 654, 428/658, 642; 165/133, 905, 180, 134.1

[56] References Cited

U.S. PATENT DOCUMENTS

| | | | |
|---|---|---|---|
| 3,807,033 | 4/1974 | Schoer et al. | 29/494 |
| 3,811,177 | 5/1974 | Schoer et al. | 29/494 |
| 3,852,873 | 12/1974 | Chartet | 29/487 |
| 3,900,151 | 8/1975 | Schoer et al. | 228/220 |
| 4,241,148 | 12/1980 | Schoer et al. | 428/654 |
| 4,891,275 | 1/1990 | Knoll | 428/650 |

Primary Examiner—John J. Zimmerman
Attorney, Agent, or Firm—Lorraine S. Melotik

[57] ABSTRACT

The present invention is an aluminum assembly comprising at least two components brazed to each other. The assembly comprises: at least a first aluminum based component having a coating of a zinc-antimony alloy having at least 1.0 wt. % antimony applied to a region of a surface of the component which is to be joined to a second aluminum based component; and at least one second aluminum based component disposed adjacent to the coating; whereby the at least first aluminum based component and the at least second aluminum based component are joined together during a controlled atmosphere brazing (CAB) process.

12 Claims, 2 Drawing Sheets

# ALUMINUM COMPONENTS COATED WITH ZINC-ANTIMONY ALLOY FOR MANUFACTURING ASSEMBLIES BY CAB BRAZING

BACKGROUND OF THE INVENTION

1. Field of the Invention

The present invention relates generally to an aluminum assembly, such as a heat exchanger for automotive vehicles, manufactured by controlled atmosphere brazing ("CAB").

2. Description of the Related Art

It is known to provide automotive vehicles with assemblies including heat exchangers such as condensers, evaporators, heater cores and coolers generally made of aluminum or aluminum alloys. These heat exchangers are alternating rows of tubes or plates. The heat exchangers often include convoluted fins brazed to the external surfaces of the tubes and turbulators disposed within the tubes and brazed to their inner surfaces. The tubes (or fins) generally carry a clad layer which has a melting temperature lower than that of the tube (or fin) core aluminum alloy. During brazing, the clad layer melts and forms brazed joints between the tube and the fins. For example, sheets made of aluminum alloys for the core with a clad layer can be formed into shape and welded into tubes. However, if greater strength (such as pressure to burst) is required of the tube, as may be in condensers, then extruded tubes instead of welded tubes are generally used. Since it is not commercially feasible to have a clad layer on the internal surface of the extruded tube, cladding on fins is used to provide the molten material needed for brazing. It is recognized that use of a clad layer adds to manufacturing complexity, cost, and component weight.

When aluminum is exposed to air, the surface layer oxidizes and forms aluminum oxide. Thus, flux is generally an important ingredient of the brazing process. Previously, the brazing of the fins and turbulators to the tube surfaces has been carried out in a vacuum furnace. Recently, however, a process known as "controlled atmosphere brazing" (CAB) has been employed. CAB furnace brazing is preferred over vacuum furnace brazing due to improved production yields, lower furnace maintenance requirements and greater braze process robustness. The function of the flux includes displacing any oxide from the surface of the aluminum and protecting it from further oxidation, reducing filler metal surface tension, and thus promoting wetting. Chloride-based fluxes are generally not used because they are highly hygroscopic and very corrosive to the aluminum. A flux commonly used in CAB furnace brazing is Nocolok™ (potassium fluoaluminate represented often as "KALF"). This flux or other similarly formulated fluxes are non-corrosive to aluminum after brazing.

Magnesium is generally included in the aluminum core to improve its strength. During the high temperatures of brazing, the magnesium may migrate through the core alloy and the clad layer to the surface where it reacts with the flux, forming high melting temperature compounds, thereby rendering the flux ineffective; i.e. the flux is "poisoned" by reacting with the magnesium. This is highly detrimental to formation of a sound braze joint because they interfere with the "wetability" of the aluminum surfaces to be brazed together. To avoid this poisoning, the magnesium content in the core alloy must be below 0.1 wt. %. From the standpoint of aluminum alloy strength, however, it is very desirable to increase the magnesium content in the core alloy.

We have unexpectedly found that these problems can be overcome by providing a coating of an zinc-antimony (Zn—Sb) alloy on the aluminum component. Such a coating substitutes for the clad layer to provide the molden metal needed for the formation of brazed joints during brazing, making it feasible to use extruded tubes and unclad fins, for example, for heating exchangers. Further, the zinc-antimony coating prevents magnesium in the core from migrating to the surface and interacting with the flux which would interfere with formation of a sound braze joint, i.e. use of this coating prevents poisoning of the flux by the magnesium. We have unexpectedly found that the use of a coating of Zn—Sb on aluminum parts allows for the formation of sound, continuous joints between parts which have desirably higher levels of magnesium, even as much as 3 wt. % magnesium. The use of our zinc-antimony coating also provides brazability for the joint, corrosion protection for the aluminum core, and enhanced brazed joint strength.

In U.S. Pat. No. 4,891,275, Knoll discloses a method whereby immediately after an aluminum shape is extruded and before it is exposed to the atmosphere, it is coated with a molten metallic layer of zinc or a zinc-base alloy. This coating is to function as a fluxless soldering or low temperature brazing material when heated. Kroll teaches that the zinc alloy is preferably a zinc-aluminum alloy which may also comprise copper. The addition of aluminum it taught to improve wetting of the aluminum by molten zinc and in combination with copper results in a sufficiently ductile coating of high tensile strength in a cold state. One of the drawbacks of the '275 method is that it requires immediately coating the aluminum part after extrusion.

SUMMARY OF THE INVENTION

Accordingly, the present invention is an aluminum assembly comprising at least two components brazed to each other. The assembly comprises: at least a first aluminum based component having a coating of a zinc-antimony alloy having at least 1.0 wt. % antimony applied to a region of a surface of the component which is to be joined to a second aluminum based component; and at least one second aluminum based component disposed adjacent said coating; whereby the at least first aluminum based component and the at least second aluminum based component are joined together during a controlled atmosphere brazing (CAB) process.

Preferably, the zinc-antimony coating comprises 1.0–20% antimony, and most preferably 2.0 to 5.0% antimony by weight. If desired, an underlayer of antimony or antimony-zinc having at least 77.0 wt. % antimony may be provided under the zinc-antimony coating. Flux may be provided at the joint prior to brazing. The assembly may be a heat exchanger assembly which involves the brazing of tubes to fins or other components. The invention in another aspect is the method for manufacturing the assemblies disclosed above.

Advantageously, according to the present invention, an assembly which has a desired higher level of magnesium in the aluminum based components for improved strength can still be brazed according to a preferred brazing process, i.e., a CAB furnace brazing process. We have unexpectedly found that the use of a zinc-antimony coating on the aluminum component prevents the magnesium from diffusing out of the core of the aluminum component to its surface where it would interact with the flux rendering it ineffective and inhibit formation of a sound joint. We believe that this advantage arises because the antimony in the antimony-zinc coating forms a layer of aluminum-antimony intermetallic compound when the coating is deposited onto the aluminum surface. This intermetallic compound layer is believed to be primarily responsible for the prevention of the migration of magnesium from the aluminum core to its surface. Neither the understanding nor validity of this theory is however necessary for the practice of the invention. It is merely put forth by the inventors in an attempt to explain the unexpected results of the invention coating.

The present invention assemblies have sound joints and increases corrosion resistance. The improved strength which results from higher levels of magnesium in the aluminum component means increased durability and allow for the component, e.g., a tube, to be made thinner. This results in cost savings and weight reduction which benefits fuel economy. Still other features and advantages of the present invention will become apparent from the following discussions taken in conjunction with the accompanying drawings.

DESCRIPTION OF THE PREFERRED EMBODIMENT(S)

Figure 1:
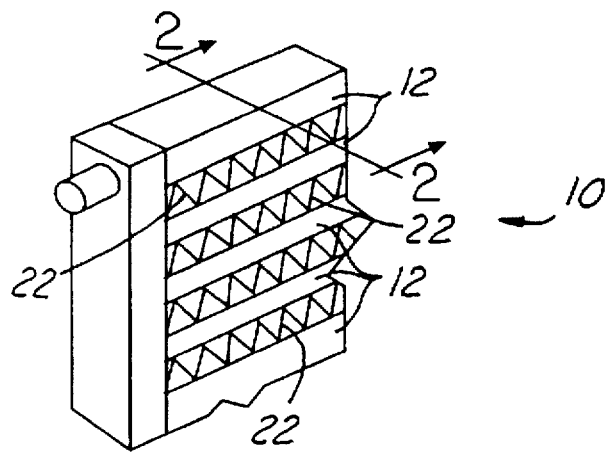
FIG. 1 is a partial perspective view of a heat exchanger assembly according to the present invention.

Referring to FIG. 1, one embodiment of an assembly according to the present invention, a heat exchanger assembly 10 is shown. In this example, the heat exchanger assembly 10 is a condenser for an air conditioning system (not shown) of a vehicle such as an automotive vehicle (not shown). It should be appreciated that the heat exchanger assembly 10 may be a parallel flow condenser, serpentine evaporator, heater core, radiator, or transmission oil cooler.

Figure 3:
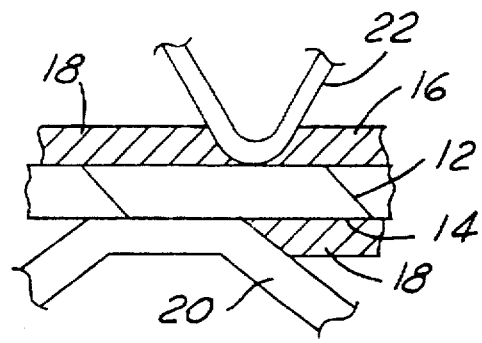
FIG. 3 is an enlarged view of circle 3 in FIG. 2.
Figure 2:
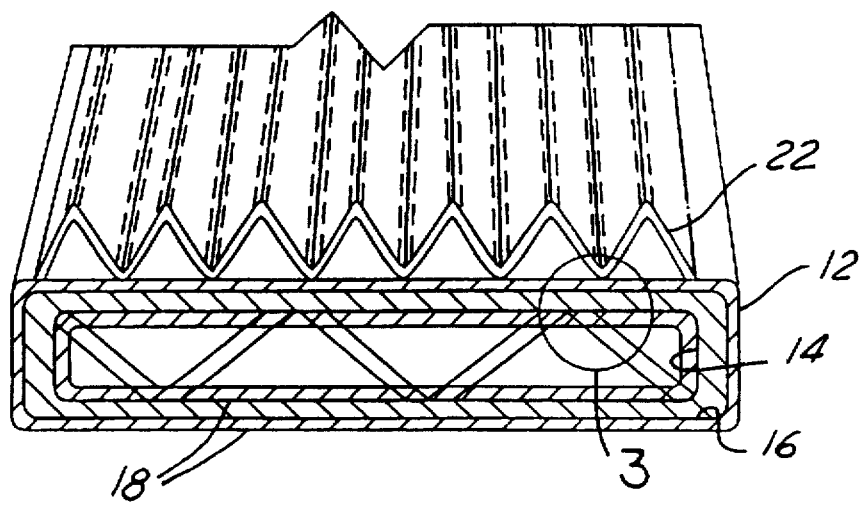
FIG. 2 is a sectional view taken along line 2—2 of FIG. 1.

Referring to FIGS. 2 and 3, the heat exchanger assembly 10 includes at least one, preferably a plurality, of a first aluminum based component. In this figure embodiment they are tubes 12. Each tube 12 for the heat exchangers extends longitudinally and is generally rectangular in shape. By "aluminum based" with respect to the first and second components, e.g., tube, fins, endsheets, plates, manifolds, headers etc. as used in this disclosure, is meant that the components comprise mostly aluminum or all aluminum. Generally the aluminum is alloyed with other metals like manganese, silicon, copper, magnesium, zinc, iron and so forth. The aluminum based components such as tube 12 are preferably selected from the Aluminum Association 1XXX, 3XXX, 5XXX and 6XXX series aluminum alloys. The core aluminum material may and desirably does include magnesium for improved strength. Preferably, the aluminum based material includes magnesium in an amount up to about 3% by weight, more preferably being between about 0.4 and 2.5% by weight. One particularly useful aluminum alloy is AA 3004 alloy (0.30 Si, 0.7 Fe, 0.25 Cu, 1.0–1.5 Mn, 0.8–1.3 Mg, 0.25 Zn, by weight percent, the balance being aluminum.

Each tube 12 has an internal surface 14 and an external surface 16. As disclosed above, a zinc-antimony coating 18 is provided at least in a region of a joint to be formed with the second component. In this embodiment, the internal tube surface 14 and external tube surface 16 each have the zinc-antimony coating 18 thereon. The coating 18 is an alloy of zinc and antimony where the antimony comprises at least 1.0 wt. % antimony, preferably about 1.0 to 20.0 weight percent antimony, based on the total weight of the alloy composition. More preferably, the coating alloy comprises 2.0 to 5.0 wt. % antimony, the rest generally being zinc. This alloy can no include small amounts of other metals like Si, Cu, or Mn, but when included are present in less than 0.1 wt. %. This coating may be provided by vapor deposition, plating, spraying a molten coating of the zinc-antimony alloy on the component surface, or the component may be dipped in a molten bath of the alloy. For example, in a dipping process, an extruded tube or one formed/welded from an aluminum sheet can be passed through a bath of molten zinc-antimony, immediately following a process step that either removes or ruptures the oxide layer on the aluminum alloy. As would be appreciated in view of this disclosure, this same dipping process can also be used on an aluminum sheet which is subsequently formed/weld into tubing.

The oxide removal or rupture process step may be realized by mechanical friction (such as rubbing or abrasion), mechanical vibration, ultrasonic vibration, fluxing by organic or inorganic acids or gaseous fluxes, oxide removal replacing by plasma or other media (such as carbon dioxide snow), etc., optionally assisted or protected by an inert or reducing atmosphere or vacuum. For most zinc-antimony alloys of the present invention the molten bath would be at about 420–570° C. Still other method useful to clean the aluminum surface prior to coating would be apparent to those skilled in the art in view of the present disclosure. In contrast to the invention of Kroll, in the present invention, it is not necessary to coat a tube immediately after extrusion. This effectively decouples the extrusion process and the coating application process, thereby the through puts of both processes no longer interfere with and constrict one another. A coating of the zinc-antimony will be formed on the aluminum when the molten alloy freezes on the tube/sheet surface as it exits the bath. Generally, it is most desired that a 5–50 micron thickness coating is achieved to provide an optimal magnesium barrier and sufficient molten metal for joint formation during brazing. As would be appreciated, for manufacturing convenience, the coating would generally be provided on the entire component surface if it is e.g., a tube. This however may not be necessary in all circumstances.

As disclosed herein, the use of the zinc-antimony coating on the aluminum desirably allows for the use of these higher magnesium containing aluminum alloys. Because of the higher magnesium content in the AA3004 alloy, its mechanical properties are significantly higher than the hitherto used AA3003 alloy. As a matter of fact, the ultimate tensile strength (MPa) and yield strength(MPa) are 65 and 75% higher, respectively, than AA3003. Similar increases can be expected with other tempers. The increase in corrosion resistance and mechanical strength through the use of the invention coating will mean increased durability, and allow the tubing thickness to be reduced, resulting in cost savings and weight reduction which benefits fuel economy.

We have further found that, if desired, an underlayer of antimony or antimony-zinc alloy, preferably at least 77.0% antimony, and more preferably containing about 21–23 wt. % zinc, may be applied on the aluminum surface under the coating described above. This underlayer would desirably be about 0.5–2 microns thick and is expected to further aid in preventing magnesium migration from the core of the aluminum component during brazing.

Referring to FIGS. 1 through 3, the heat exchanger assembly 10 includes at least one second aluminum based component disposed adjacent the coating 18, which is to be joined by brazing to the tube 12. For example, the heat exchanger assembly 10 may include a turbulator 20 disposed within the tube 12 adjacent the coating 18 on the internal surface 14 of the tube. The turbulator 20 extends longitudinally and laterally in a series of undulations. The turbulator 20 breaks up the flow of fluid passing through the tube 12 in use to effect heat transfer. In another example, the heat exchanger assembly 10 includes a fin 22 disposed adjacent the coating 18 on the external surface 16 of tube 12. The fin 22 extends longitudinally and laterally in a series of undulations. The turbulator 20 and fin 22 are each made of an aluminum based material such as the Aluminum Association 3XXX series aluminum alloys. The second components (e.g. headers, plates, end sheets, fins, manifolds, side supports, etc.) may be made of other than 3XXX series aluminum alloy, such as 5XXX, 7XXX, 1XXX, 6XXX. These second components may also be coated with the zinc-antimony coating disclosed above for coating the first component, in this preferred embodiment being the tubes 12. Generally, however, such coating is not used on the turbulator 20 and fin 22 when it has been applied to the tubes 12.

For manufacture of the assembly 10, the turbulator 20 and fin 22 are joined to the tube 12 using a CAB furnace brazing process. A brazing flux may be applied to a joint between the tube 12 and any component to be joined to the tube 12 by brazing, i.e., the turbulator 20 or fin 22. The flux can be applied onto the joint area by any means such as brushing, dipping, and spraying, the latter being preferred because it provides more uniform application. If the flux is applied via the conventional spray process, it can be sprayed onto the mechanically assembled component prior to brazing, or the flux particles can be deposited on the molten zinc-antimony on the tube or sheet surface during the coating process. In the last situation, these particles become embedded on the coating surface when the coating freezes, as is done in the well known prefluxing technology.

During the brazing process, the zinc-antimony coating melts and flows. The molten zinc-antimony will spread, metallurgically interact with the fin and the tube core, and form a joint between the tube and the fins when the temperature cools down. If flux is applied at the joint prior to brazing, it helps the molten zinc-antimony to spread. While it is desirably used, it is not necessary to use flux in the brazing of the present invention and a brazing flux is not necessary for a sound joint. A suitable aluminum brazing flux is Nocolok™ or other similarly formulated fluxes that melt at about 400–560° C.

This wetting allows the braze material to flow into a joint to be formed between the tube 12 and other components of the heat exchanger assembly and creates a sound braze joint. The coating acts to prevent the magnesium from migrating out of the aluminum material and hence substantially prevents the magnesium from interacting with the flux which interferes with the formation of a sound braze joint. It should also be appreciated that the fins 22 and turbulators 20 as well as plates and manifolds of evaporators (not shown) may have coating 18, although generally no such coating would be provided.

As would be known to those skilled in the art, the CAB furnace brazing process is conventional and known in the art. In the CAB process, the heat exchanger assembly 10, with flux generally applied in at least the areas of the to be formed braze joints, is placed on a braze holding furnace fixture, and preheated, for example, to a temperature in a range from about 80° C. to about 200° C. The heat exchanger assembly 10 and braze holding furnace fixture are transferred to a prebraze chamber where it is soaked for about 3–15 minutes at about 330° C. Subsequently, the hot heat exchanger assembly 10 and braze holding furnace fixture are transferred to a conveyor and moved through a CAB furnace 34 which is purged by applying a nitrogen gas at inside the CAB furnace.

In the CAB furnace, the heat exchanger assembly 10 is generally kept for 3–10 minutes at about 420–600° C. Other CAB process parameters have been well established in the industry and none is meant to be critical to the present invention. The brazed heat exchanger assembly 10 is then cooled, removed and applied for its intended use.

Figure 4:
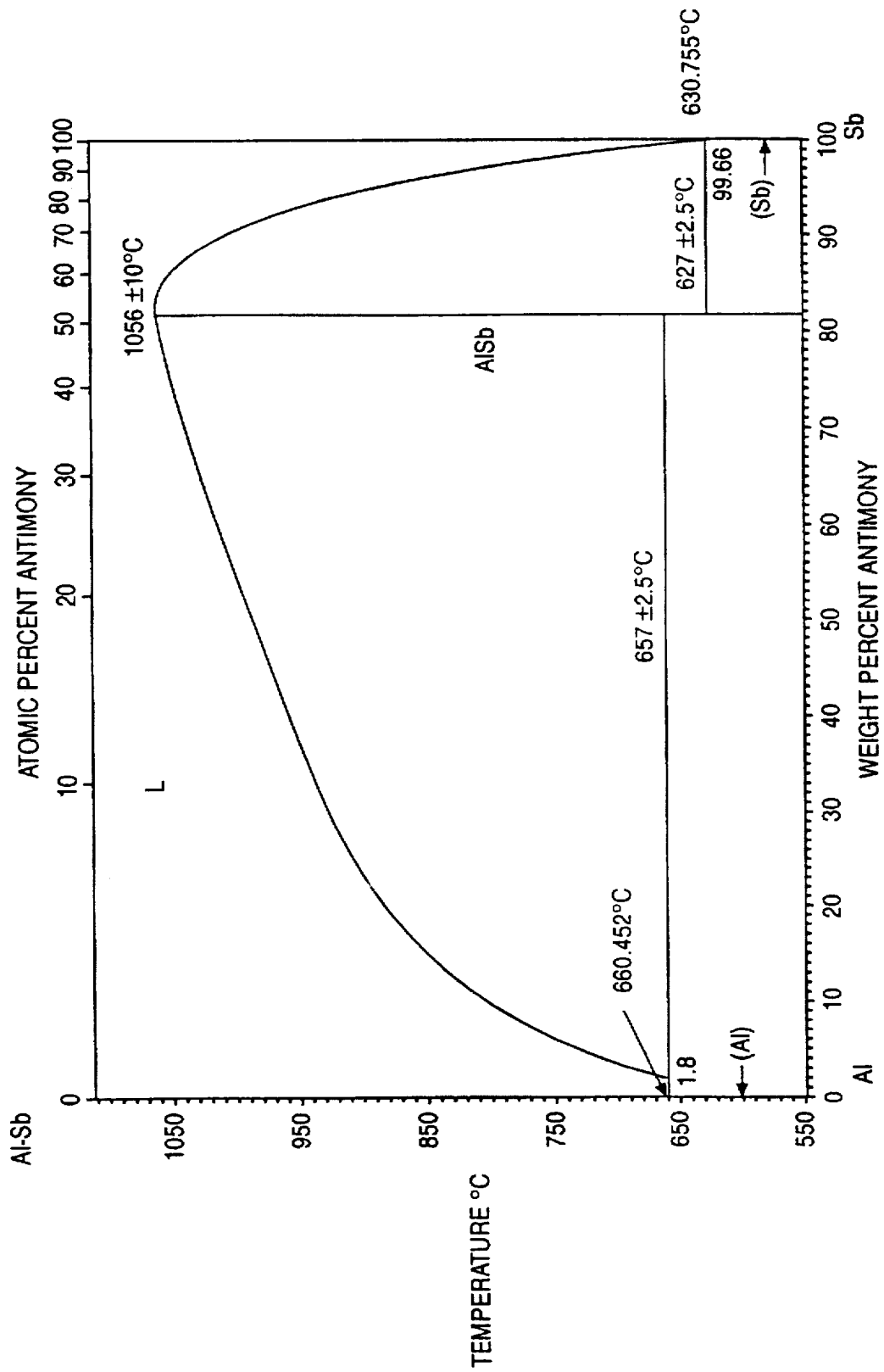
FIG. 4 is a binary phase diagram of aluminum-antimony.

The zinc-antimony coating has been found to prevent the migration of magnesium to the area of the joint rendering the flux ineffective. As would be appreciated by those skilled in the art, this advantages will result in stronger brazed joints. The coating replaces a conventional clad layer on the tube or the fin for brazability. Such clad layer are often made of AA4XXX (e.g. 4045). The use of a zinc-antimony coating provides cost saving over the clad layer because of the manufacturing cost for the clad layer. The use of the coating also makes it feasible to use extruded tubes and unclad fins, for heat exchanger manufacturing. Using the coating also provided galvanic corrosion protection for the material of the component. Since zinc is anodic to aluminum, we believe that any external corrosion will not penetrate into the core of the component to form perforations but will rather stay on the surface. In order to explain the unexpected beneficial results of the invention coating, we propose that in applying the zinc-antimony coating, an aluminum-antimony intermetallic layer will be formed which enhances the metallurgical bonding between the joint, and the first and second components, here the tube and fins. This can be seen from the aluminum-antimony phase diagram (FIG. 4), which shows the formation of the aluminum-antimony (Al—Sb) intermetallic phase. We also believe that the zinc-antimony coating prevents the migration of the magnesium to the aluminum surface because the Al—Sb intermetallic layer inhibits magnesium diffusion. Neither the validity nor the understanding of the above theory is necessary for the practice of the invention. It is only provided as an aid in explaining why we believe this use of the zinc-antimony layer provides such excellent and unexpected results for CAB brazing of high magnesium aluminum.

The present invention has been described in an illustrative manner. Terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An aluminum assembly comprising at least two components brazed to each other, the assembly comprising:
    at least a first aluminum based component having a coating of a zinc antimony alloy consisting essentially of zinc and antimony and having at least 1.0 wt. % antimony applied to a region of a surface of the component which is to be jointed to a second aluminum based component; and
    at least one second aluminum based component disposed adjacent said coating;
    whereby the at least first aluminum based component and the at least second aluminum based component are joined together during a controlled atmosphere brazing (CAB) process.

2. The assembly as set forth in claim 1 wherein said zinc-antimony alloy comprises 1.0 to 20.0 percent antimony by weight.

3. The assembly as set forth in claim 1 wherein said coating is applied by dipping or spray coating onto the region of the at least one first component.

4. The assembly as set forth in claim 3 wherein the zinc-antimony coating is provided from a molten bath thereof, wherein the coating application is immediately preceded or coupled with a process step that removes or at least ruptures any oxide layer present on the at least one first aluminum based component in at least the region of a surface to be joined to said second aluminum based component.

5. The assembly as set forth in claim 1 wherein said zinc-antimony coating is provided in a thickness of between about 5 to 50 microns.

6. The assembly as set forth in claim 1 wherein the assembly is a heat exchanger assembly; said at least one first aluminum based component comprises a tube having an internal and external surface; and said at least one second aluminum based component comprises:

a turbulator disposed within said tube adjacent said coating on the internal surface, or a fin disposed adjacent said coating on said external surface.

7. The assembly as set forth in claim 6 wherein said at least one first aluminum based component comprises material selected from the Aluminum Association 1XXX, 3XXX, 5XXX and 6XXX series aluminum alloys, and modifications thereof.

8. The assembly as set forth in claim 6 wherein said at least one second aluminum based component comprises material of the Aluminum Association 1XXX, 5XXX, 6XXX and 7XXX series aluminum alloys and modifications thereof.

9. The assembly as set forth in claim 1 wherein an aluminum brazing flux is applied to a joint between said at least one first aluminum based component and said at least one second aluminum based component prior to the controlled atmosphere brazing process.

10. The assembly as set forth in claim 1, wherein flux particles are pre-deposited on the coating surface.

11. The assembly as set forth in claim 1 wherein magnesium is included in said aluminum based components in an amount up to about 3% by weight.

12. The assembly according to claim 1 wherein an underlayer of (i) antimony or (ii) zinc-antimony comprising at least 77.0 wt. % antimony is provided under said zinc-antimony coating.

* * * * *